UNITED STATES PATENT OFFICE.

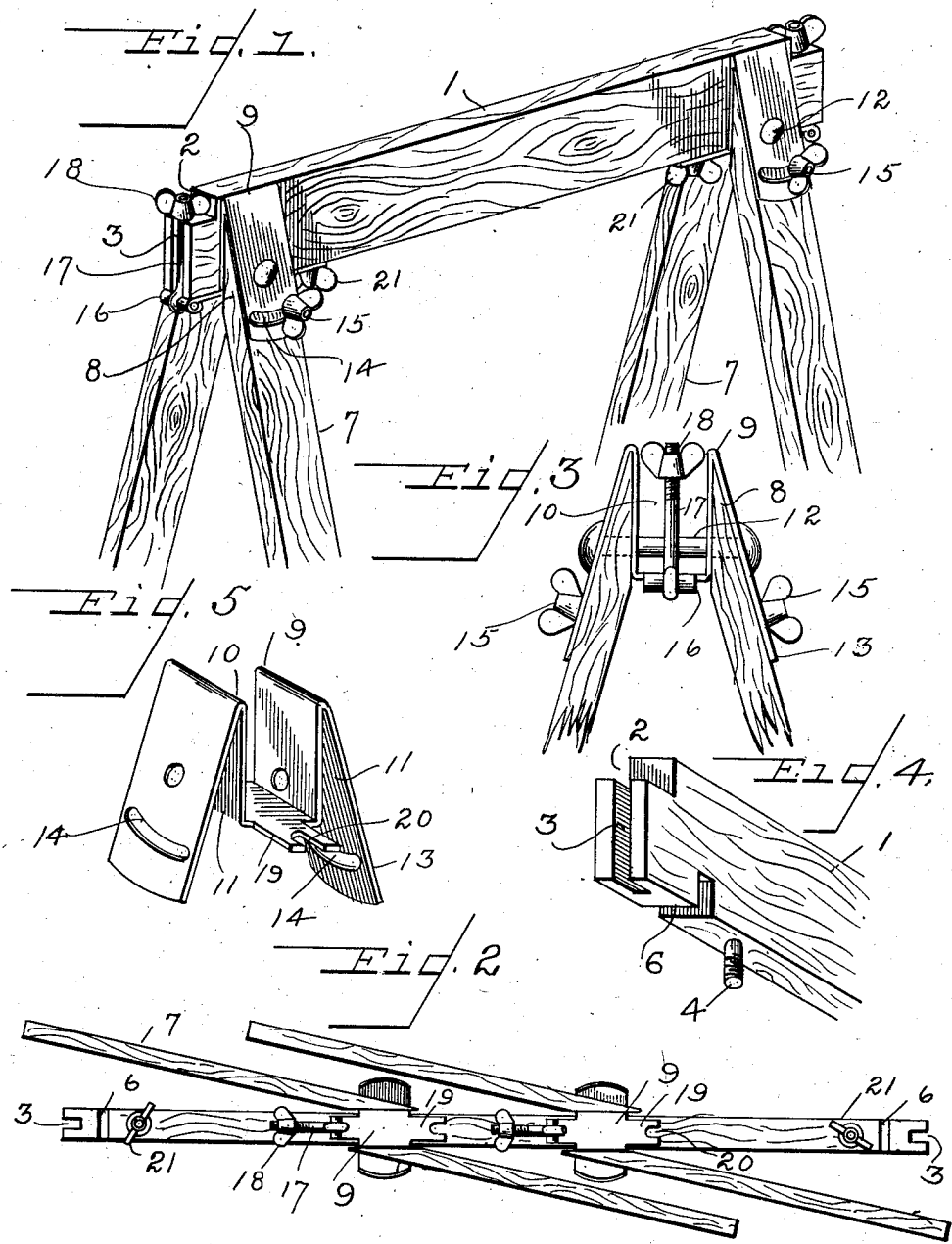

JOHN W. SMITH, OF DAYTON, OHIO.

KNOCKDOWN TRESTLE.

1,010,458.     Specification of Letters Patent.     Patented Dec. 5, 1911.

Application filed July 29, 1910. Serial No. 574,430.

*To all whom it may concern:*

Be it known that I, JOHN W. SMITH, a citizen of the United States, residing at Dayton, in the county of Montgomery and State of Ohio, have invented certain new and useful Improvements in Knockdown Trestles, of which the following is a specification.

My invention relates to trestles and particularly knock-down trestles especially adapted to the uses of builders, decorators, and other artisans.

The object of the invention is to simplify the structure as well as the means and mode of operation of such devices, whereby they will not only be cheapened in construction, but will be rendered more reliable when in use, easily adjusted and disengaged, and unlikely to get out of repair.

A further object is to provide a trestle in which beams of different lengths may be used with a given set of legs, or legs of different height may be employed with a given beam interchangeably, thus providing for all conditions of use with a minimum number of parts.

A further object is to provide a structure in which pairs of legs of different length may be used with a single beam, thus enabling the trestle to be used on a sloping or uneven surface.

With the above primary and other incidental objects in view as will more fully appear in the specification, the invention consists of the features of construction, the parts and combinations thereof or their equivalents, as hereinafter described and set forth in the claims.

Referring to the drawings, Figure 1 is a perspective view of the assembled trestle. Fig. 2 is a plan view of the trestle in knockdown condition, with the parts nested for storage or for transportation. Fig. 3 is an end elevation of the leg section with the beam removed. Fig. 4 is a detail perspective view of one end of the beam removed from the leg portion. Fig. 5 is a detail perspective of the coupling member.

Like parts are indicated by similar characters of reference throughout the several views.

In constructing the trestle there is employed a beam 1 having a rabbet or recess 2 in each upper corner, and a vertical slot 3 in each end. In the under side of the beam, adjacent to each end there is provided a screw threaded stud 4, and intermediate the stud 4 and the end of the beam a transverse slot 6. The legs 7 are straight bars tapered at their upper ends as at 8, and engaged with the coupling member 9, by which the leg portions are detachably secured to the beam 1.

The coupling member comprises a substantially inverted W shaped member, within the central recess 10 of which the beam 1 is adapted to engage. As will be seen in Figs. 3 and 5 the central recess 10 of the coupling member is open upward, while on either side thereof are recesses 11 opening downward within which the tapered ends 8 of the legs 7 engage. The legs 7 are pivotally connected with the coupling member by means of a transverse stud or rivet 12, which projects through the central recess 10 above the bottom thereof as shown in Fig. 3. In each of the outermost wings 13 of the coupling member is a quadrant slot 14 concentric with the stud or rivet 12. The legs 7 pivoted within the recesses 11 upon the rivet 12 are each provided with a stud projecting through the quadrant slot 14 and carrying a thumb or clamp nut 15. The legs are thus free to oscillate upon the pivotal connection 12 within the limits of the slot 14, and are adapted to be secured in their adjusted positions by the clamp nuts 15. The bottom of the recess 10 is extended in either direction beyond the main portion of the coupling member, to one of which extensions there is pivotally attached as at 16 a screw threaded stem or bolt 17. The bolt 17 is provided with a clamp nut 18. The opposite extension 19 is perforated or slotted as at 20, to engage about the stud 4 in the under side of the beam. The stud 4 is also provided with a clamp nut 21.

In setting up the trestle, the extremity of the beam 1 is inserted within the recess 10 of the coupling member with the transverse slot 6 engaging the transverse stud or rivet 12, and the slotted or perforated extension 19 engaging about the stud 4. The pivoted bolt 17 is then turned upward into the vertical slot 3 in the end of the beam 1, with the clamp nut 18 in the rabbet 2. The clamp nuts 18 on the pivoted bolt 17 and that on the stud 4 are then tightened securing the coupling member in place. The legs 7 are then secured in proper position by means of the clamp nuts 15.

The studs 14 may be so located in the legs 7 that the legs may both swing in one direction relative to the coupling member, or they swing in opposite directions as shown in Fig. 2.

When preparing the trestle for storage or shipment, the coupling members are disconnected from the beam by releasing the clamp nuts 18 and 21, and the pivoted bolt 17, and the mid portion of the beam inserted in the recess 10 as shown in Fig. 2, the legs 7 are then turned on the pivotal connections into the same plane with the beam, which makes a compact structure, several of which can be piled, one on top of another.

The rabbet 2 permits the clamp nut 18 to be located below the top of the beam 1 where it will not interfere with work placed on the trestle.

From the above description it will be apparent that there is thus produced a device of the character described, possessing the particular features of advantage before enumerated as desirable, but which obviously is susceptible of modification in its form, proportion, detail construction, and arrangement of parts, without departing from the principle involved, or sacrificing any of its advantages.

Having thus described my invention I claim;

1. In a knock-down trestle, a beam having transverse slots in the under edge thereof adjacent to the opposite ends of the beam, leg members, a coupling member connecting the leg members in pairs and having therein an upward opening recess intermediate the leg members, a transverse member extending through said recess above the bottom thereof adapted to engage in the slot of the beam to prevent longitudinal movement thereof, the beam being detachable by a vertical movement out of said recess, means carried by the coupling member and detachably engaging the beam to prevent the vertical movement thereof.

2. In a knock-down trestle, a beam having transverse slots in the under edge thereof adjacent to the opposite ends of the beam, leg members, a coupling member connecting the leg members in pairs and having therein an upward opening recess intermediate the leg members, a transverse stud carried by the coupling member forming a pivotal connection for the leg members and extending through the central recess, and over which the slots of the beam engage to limit the longitudinal movement thereof, and means carried by the coupling member to prevent vertical movement thereof and thereby the disengagement of the slot of the beam from the transverse stud.

3. In a knock-down trestle, a beam having transverse slots in the under edge thereof adjacent to the opposite ends of the beam, leg members, a coupling member connecting the leg members in pairs and having therein an upward opening recess intermediate the leg members, a transverse member extending through said recess above the bottom thereof adapted to engage in the slots of the beam to prevent longitudinal movement thereof, the beam being detachable by a vertical movement out of said recess, and a swinging member pivotally carried on the coupling member and adapted to be swung to and from a position to engage the top of the beam to limit the vertical movement thereof.

4. In a knock down trestle, a beam having a transverse notch therein, an inverted W shaped coupling member, leg members projecting into the outermost recesses of the coupling member, a stud extending through the coupling member and pivotally connecting the leg portions therewith, the coupling member having a central recess through which the stud extends above the bottom thereof, said beam being adapted to engage in the central recess of the coupling member with the transverse notch engaged over the stud, and means for securing the beam and the legs in adjusted position.

5. In a knock-down trestle, a beam, leg members connected in pairs a coupling member comprising a piece of sheet metal bent to substantially inverted W form whereby there will be produced two recesses opening downward for the reception of the leg members, and an intermediate recess opening upward for the reception of the beam, and a transverse stud extending through all three of said recesses and engaging two leg members and with which the beam is engaged.

6. In a knock-down trestle, a beam, leg members connected in pairs, a coupling member comprising a piece of sheet metal bent to substantially inverted W form whereby there will be produced two recesses opening downward for the reception of the leg members, and an intermediate recess opening upward for the reception of the beam, all of said recesses being open at opposite sides, means for pivotally engaging the leg members in the outermost recesses whereby said leg members may oscillate independent of the coupling member, and means for detachably engaging the beam within the central recess.

In testimony whereof, I have hereunto set my hand this 23d day of July 1910.

JOHN W. SMITH.

Witnesses:
HARRY F. NOLAN,
F. L. WALKER.